United States Patent
Park et al.

(10) Patent No.: US 12,482,066 B2
(45) Date of Patent: Nov. 25, 2025

(54) MOTION COMPENSATION PROCESSING APPARATUS AND METHOD OF MEDICAL IMAGES

(71) Applicant: CLARIPI INC., Seoul (KR)

(72) Inventors: Hyun Sook Park, Seoul (KR); Tae Jin Kim, Seoul (KR); Chul Kyun Ahn, Seoul (KR)

(73) Assignee: CLARIPI INC., Seoul (KR)

( * ) Notice: Subject to any disclaimer, the term of this patent is extended or adjusted under 35 U.S.C. 154(b) by 427 days.

(21) Appl. No.: 18/148,267

(22) Filed: Dec. 29, 2022

(65) Prior Publication Data

US 2023/0214972 A1    Jul. 6, 2023

(30) Foreign Application Priority Data

Jan. 4, 2022  (KR) .................. 10-2022-0001015

(51) Int. Cl.
*G06T 5/20*     (2006.01)
*G06T 5/70*     (2024.01)
*G06T 7/20*     (2017.01)

(52) U.S. Cl.
CPC .................. *G06T 5/20* (2013.01); *G06T 5/70* (2024.01); *G06T 7/20* (2013.01);
(Continued)

(58) Field of Classification Search
CPC .... G06T 5/20; G06T 5/70; G06T 7/20; G06T 2207/20021; G06T 2207/20081; G06T 2207/20221; G06T 2207/20224; G06T 2207/30004; G06T 5/60; G06T 5/50; G06T 2207/20084; G06T 3/4046; G06T 9/002; G06T 2207/20076; A61B 6/055; A61B 6/032; A61B 6/037; A61B 6/5211;
(Continued)

(56) References Cited

U.S. PATENT DOCUMENTS

| | | | |
|---|---|---|---|
| 10,790,056 B1 * | 9/2020 | Accomazzi | H04L 67/1097 |
| 2011/0158488 A1 * | 6/2011 | Cohen | A61B 6/527 |
| | | | 382/128 |
| 2016/0267654 A1 * | 9/2016 | Wang | A61B 6/032 |
| 2020/0160972 A1 * | 5/2020 | Bériault | G06T 15/06 |
| 2020/0219254 A1 * | 7/2020 | Regensburger | G06T 7/60 |

(Continued)

FOREIGN PATENT DOCUMENTS

| | | | | |
|---|---|---|---|---|
| CA | 3178420 A1 * | 11/2021 | | A61B 5/0036 |
| CN | 109727203 A * | 5/2019 | | A61B 6/00 |

(Continued)

OTHER PUBLICATIONS

Tonghe Wang et al., "A review on medical imaging synthesis using deep learning and its clinical applications," J Appl Clin Med Phys, Dec. 11, 2020.

*Primary Examiner* — Jose L Couso

(57) ABSTRACT

Disclosed are a motion compensation processing apparatus and method of medical images, in which motion of organs is corrected, the method including: acquiring the medical image and combining an organ motion component into the medical image; training at least one deep learning model based on the medical image combined with the organ motion component so that the deep learning model can remove the organ motion component; and acquiring a processing medical image, selecting a deep learning model corresponding to an organ included in the processing medical image, and removing a motion component for the organ.

13 Claims, 9 Drawing Sheets

(52) U.S. Cl.
CPC .............. *G06T 2207/20021* (2013.01); *G06T 2207/20081* (2013.01); *G06T 2207/20221* (2013.01); *G06T 2207/20224* (2013.01); *G06T 2207/30004* (2013.01)

(58) Field of Classification Search
CPC ....... A61B 6/5264; A61B 6/503; A61B 6/527; A61B 6/7207; A61B 6/03; G06V 10/25; G06V 2201/031; G06V 10/44; G06V 10/762; G06V 10/454; G06V 10/54; G06V 10/774; G06V 10/82; G06V 20/41; G06V 30/18057; G06V 20/698; G06V 30/19173; G16H 30/40; G16H 50/20; G06N 3/02; G06N 3/08–088; G06N 3/0445; G06N 3/0454; G06N 3/4046; G06N 7/00; G06N 7/01; G06N 20/00; G06K 7/1482; G06F 18/214; G06F 18/22; G06F 18/241; G06F 18/24; G06F 18/2411; G06F 18/2415; Y10S 128/925
See application file for complete search history.

(56) References Cited

U.S. PATENT DOCUMENTS

| | | | |
|---|---|---|---|
| 2020/0311940 A1* | 10/2020 | Krebs | G06T 7/246 |
| 2021/0121134 A1* | 4/2021 | Xia | A61B 5/7285 |
| 2021/0397886 A1* | 12/2021 | Chen | G06V 10/82 |
| 2022/0047237 A1* | 2/2022 | Liu | A61B 6/032 |

FOREIGN PATENT DOCUMENTS

| | | | | | |
|---|---|---|---|---|---|
| CN | 110390361 | A | * | 10/2019 | A61B 6/03 |
| CN | 111462020 | A | * | 7/2020 | G06N 20/00 |
| CN | 112603361 | A | * | 4/2021 | A61B 8/085 |
| CN | 112614152 | A | * | 4/2021 | G06N 3/0454 |
| CN | 113112486 | A | * | 7/2021 | G06N 20/00 |
| CN | 113112499 | A | * | 7/2021 | G06N 3/0454 |
| CN | 113223055 | A | * | 8/2021 | G06N 3/0454 |
| CN | 113822845 | A | * | 12/2021 | G06F 18/214 |
| DE | 102018112301 | A1 | * | 12/2018 | A61B 5/0035 |
| JP | 2010-502255 | A | | 1/2010 | |
| JP | 2020-179031 | A | | 11/2020 | |
| KR | 10-2014-0134903 | A | | 11/2014 | |

\* cited by examiner

MOTION COMPENSATION PROCESSING APPARATUS AND METHOD OF MEDICAL IMAGES

CROSS REFERENCE TO RELATED APPLICATION

This application is based on and claims priority under 35 U.S.C. § 119 to Korean Patent Application No. 10-2022-0001015 filed on Jan. 4, 2022 in the Korean Intellectual Property Office, the disclosure of which is incorporated by reference herein in its entirety.

BACKGROUND OF THE INVENTION

Field of the Invention

The disclosure relates to a motion compensation processing apparatus and method of medical images, and more particularly to a motion compensation processing apparatus and method of medical images, in which motion of organs generated while acquiring the medical images is corrected.

Description of the Related Art

In general, medical apparatuses such as X-ray, computed tomography (CT), and magnetic resonance imaging (MRI) scanners have been used to acquire medical images. In modern medical science, the medical images acquired through such medical apparatuses are used by a doctor as a very important basis in making a decision by determining the presence and characteristics of lesions in the procedure of diagnosing and treating a patient.

The conventional medical image processing technology has already been disclosed in Korean Patent Publication No. 2014-0134903 (titled "METHOD AND APPARATUSCE FOR IMPROVING QUALITY OF MEDICAL IMAGE" and published on Nov. 25, 2014). This published invention is to reduce noise in a medical image.

Meanwhile, various causes of generating noise in medical images are known. In particular, organs may move while acquiring the medical images, and therefore research and development are being actively conducted to correct noise due to motion of organs. However, most of techniques for correcting the motion of organs are based on comparison between images and thus have a problem in that image processing time is delayed.

DOCUMENTS OF RELATED ART (Patent Document) Korean Patent Publication No. 2014-0134903 (titled "METHOD AND APPARATUSCE FOR IMPROVING QUALITY OF MEDICAL IMAGE" and published on Nov. 25, 2014)

SUMMARY OF THE INVENTION

An aspect of the disclosure is to provide a motion compensation processing apparatus and method of medical images, in which motion of organs is corrected.

According to an embodiment of the disclosure, a motion compensation processing method of a medical image includes: acquiring the medical image and combining an organ motion component into the medical image; training at least one deep learning model based on the medical image combined with the organ motion component so that the deep learning model can remove the organ motion component; and acquiring a processing medical image, selecting a deep learning model corresponding to an organ included in the processing medical image, and removing a motion component for the organ.

The combining of the organ motion component may include combining a first medical image including an organ motion component and a second medical image including no organ motion component.

The combining of the first medical image and the second medical image may be performed in a sinogram dimension.

The combining of the organ motion component may include a deep learning model that extracts the organ motion component from the first medical image and combines the organ motion component into the second medical image.

The combining of the organ motion component may include: converting the first medical image into a sinogram dimension; extracting the organ motion component from a sinogram for the first medical image; converting the second medical image into a sinogram dimension; combining the organ motion component into a sinogram for the second medical image; and converting the sinogram for the second medical image combined with the organ motion component into an image dimension by back projection.

The training may include training the deep learning model for a pair of the medical image including the organ motion component and the medical image including no organ motion component.

The deep learning model may be trained to minimize a difference between the medical image including the organ motion component and the medical image including no organ motion component with respect to the medical image including no organ motion component.

The removing may include: dividing organs included in the processing medical image according to regions; selecting the deep learning model corresponding to an organ, of which motion needs to be removed, among the divided organs; and removing the motion of the organ based on the deep learning model.

The deep learning models may be used alone or together with respect to the number of organs of which motion needs to be removed.

Upon using the deep learning model alone, the deep learning model may remove the organ motion component by extracting an organ motion component image from the processing medical image, applying a preset value to the extracted organ motion component image, and subtracting the extracted organ motion component image, to which the preset value is applied, from the processing medical image.

Upon using the deep learning models together, the plurality of deep learning models may remove the organ motion component by extracting corresponding organ motion component images from input processing medical images, mixing a plurality of organ motion component images according to a preset rule, and subtracting the mixed organ motion component image from the processing medical image.

The dividing according to the regions may include using a deep learning model that divides the organs according to the regions based on a profile of organ motion.

The deep learning model may include a plurality of deep learning models provided corresponding to a plurality of organs and trained to remove the motion of the organs.

According to an embodiment of the disclosure, a motion compensation processing apparatus of a medical image includes: a communication module configured to receive the medical image; an image generating module configured to combine an organ motion component into the medical image; and an image processing module configured to train at least one deep learning model based on the medical image combined with the organ motion component, and remove a motion component for the organ by select a deep learning model corresponding to an organ included in a processing medical image while providing the processing medical image.

A motion compensation processing apparatus and method of medical images according to the disclosure have effects as follows.

First, the organ motion in the medical image is corrected based on the deep learning model, thereby having an effect on obtaining the high-quality readout image.

Second, the plurality of deep learning models are made and trained for respective organs, and therefore the deep learning is more effectively applied to the medical images in which safety is important.

The foregoing technical effects of the disclosure are not limited to the aforementioned effects, and other technical effects not mentioned above may become apparent to those skilled in the art from the following description.

DETAILED DESCRIPTION OF THE INVENTION

Hereinafter, embodiments of the disclosure will be described in detail with reference to the accompanying drawings. However, the disclosure is not limited to the embodiments set forth herein, but may be implemented in various forms. The following embodiments are merely provided to make the disclosure complete, and to make a person having ordinary knowledge in the art fully understand the scope of the disclosure. In the accompanying drawings, the shapes and the like of elements may be exaggerated for clarity, and like numerals denote like elements.

Figure 1:
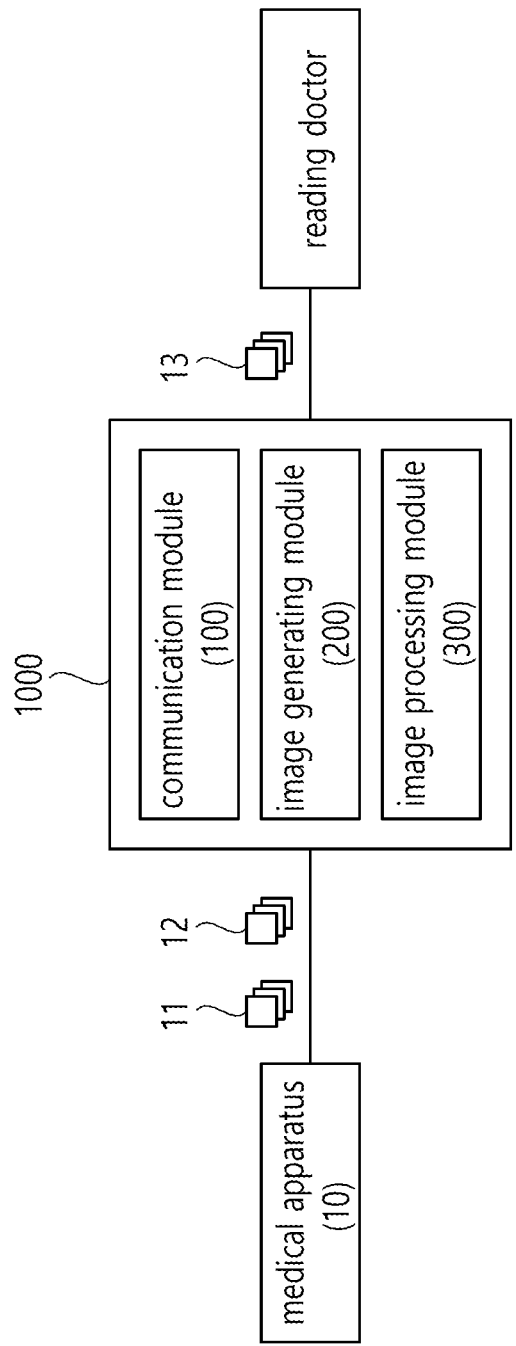
FIG. 1 is a conceptual view schematically showing an apparatus for motion compensation processing of medical images according to an embodiment.
Figure 2:
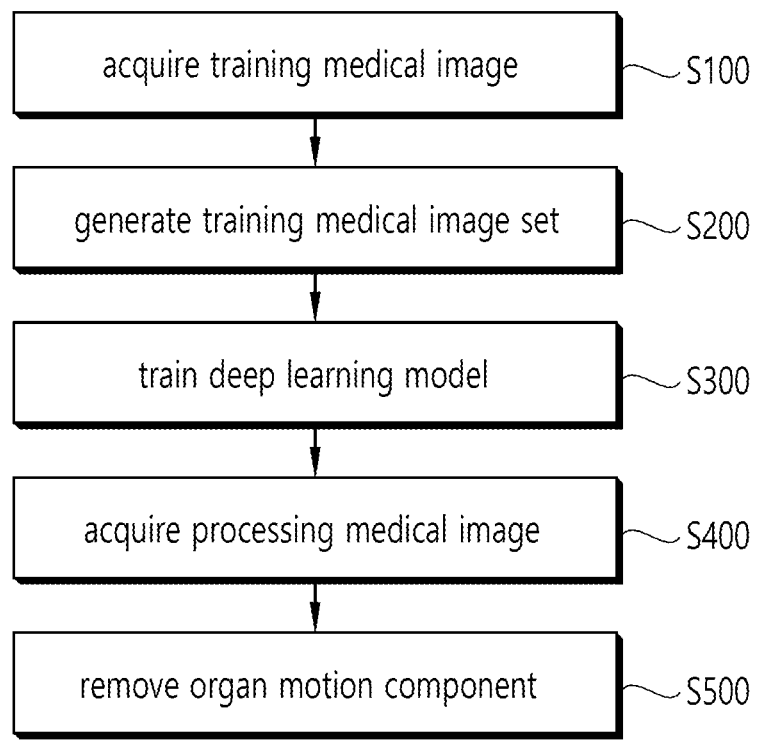
FIG. 2 is a flowchart showing a method of motion compensation processing of medical images according to an embodiment.

FIG. 1 is a conceptual view schematically showing an apparatus for motion compensation processing of medical images according to an embodiment, and FIG. 2 is a flowchart showing a method of motion compensation processing of medical images according to an embodiment.

As shown in FIGS. 1 and 2, an apparatus 1000 for motion compensation medical processing of images (hereinafter referred to as a "motion compensation processing apparatus") according to an embodiment corrects motion of organs included in medical images 11, 12 acquired by a medical apparatus 10 and generates a high-quality readout image 30.

Here, a medical apparatus 10 may include a computed tomography (CT) scanner, a magnetic resonance imaging (MRI) scanner, a position emission tomography (PET) scanner, etc., and the medical images 11, 12 may include CT images. However, there are no limits to the types of medical apparatuses 10 and the formats of medical images 11, 12.

Meanwhile, the motion compensation processing apparatus 1000 may include a communication module 100, an image generating module 200, and an image processing module 300.

The communication module 100 receives the medical images 11, 12 provided from the medical apparatus 10 or a database (not shown). Here, the medical: images 11, 12 provided to the communication module 100 may include training medical images 11 and the processing medical images 12.

Thus, the image generating module 200 acquires the training medical images 11 provided through the communication module 100 (S200). Further, the image generating module 200 generates a training medical image set from the training medical images 11 (S200). For example, the training medical images 11 may include images including an organ motion component and images including no the organ motion component. Thus, the image generating module 200 may generate the training medical image set by combining the organ motion component into the images including no organ motion component.

In other words, the number of images including the organ motion component may be generally insufficient to train a deep learning model for processing the processing medical images 12 later. Thus, the image generating module 200 may generate a set of training medical images sufficient to train the deep learning model by combining the organ motion component into the images including no organ motion component.

Meanwhile, the image processing module 300 trains the deep learning model based on the generated training medical image set (S300). Thus, when the processing medical images including the organ motion component are provided (S400), the organ motion component is removed based on the deep learning model trained in advance, thereby generating the high-quality readout image 30 (S500).

Below, the image generating module 200 and the image processing module 300 will be described in detail with reference to the accompanying drawings.

Figure 3:
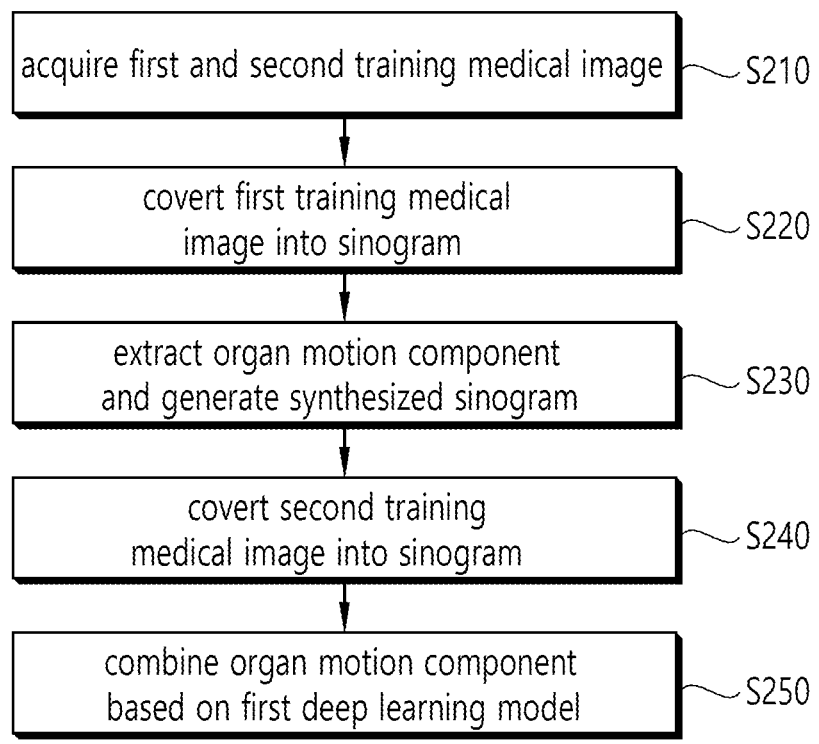
FIG. 3 is a flowchart showing a process of generating a training medical image set in an image generating module according to an embodiment.
Figure 4:
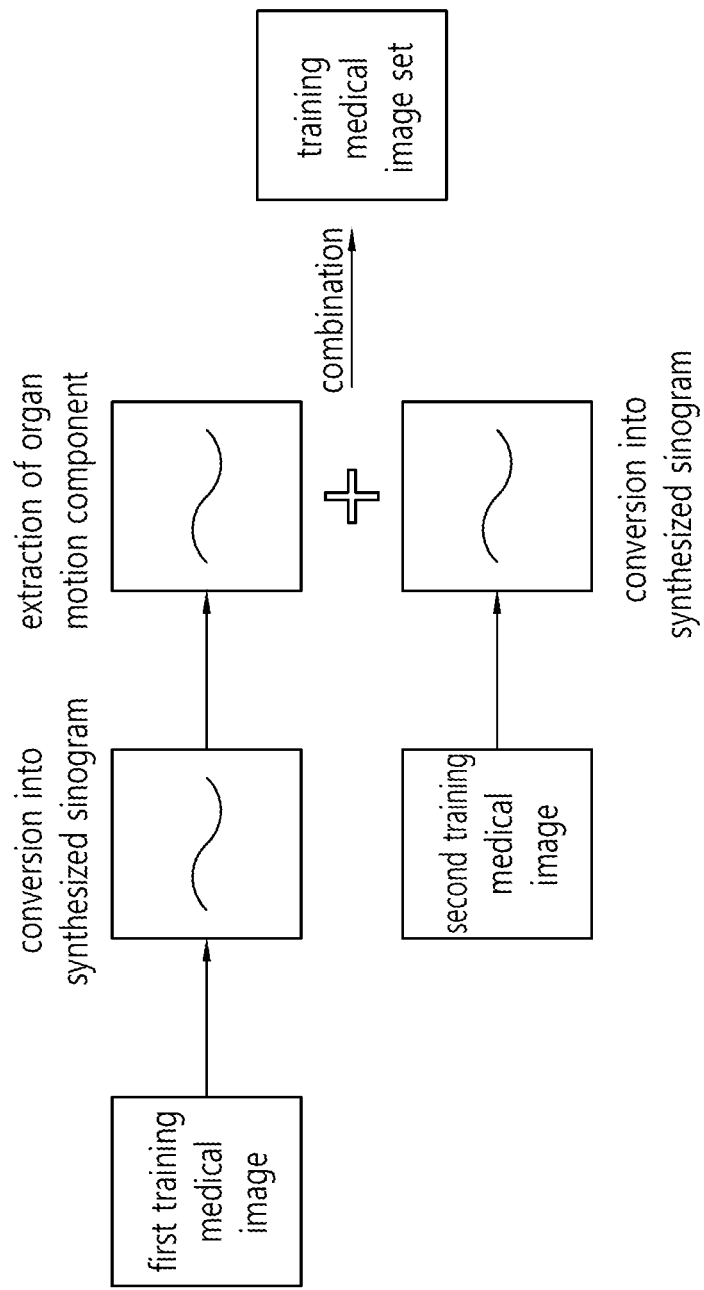
FIG. 4 is a conceptual view showing a process of generating a training medical image set in an image generating module according to an embodiment.

FIG. 3 is a flowchart showing a process of generating a training medical image set in an image generating module according to an embodiment, and FIG. 4 is a conceptual view showing a process of generating a training medical image set in an image generating module according to an embodiment.

As shown in FIGS. 3 and 4, the image generating module 200 according to an embodiment generates the training medical image set based on the training medical images 11.

For example, the image generating module 200 may receive the training medical images 11 including different organ motion components, respectively (S210). For example, the training medical images 11 may include images including motion of different organs such as a heart and a lung, or images including motion of a plurality of organs such as a heart and a lung.

Thus, the image generating module 200 may generate a plurality of training medical image sets including motion of different organs, respectively.

To this end, the image generating module 200 may extract an organ motion component from the training medical images 11 including the organ motion component, and combine the organ motion component into the images including no organ motion component.

In more detail, the image generating module 200 acquires a first training medical image including the organ motion component and converts the first training medical image into a synthesized sinogram dimension (S220). In this case, the image generating module 200 determines an attenuation coefficient for each pixel of an image, information about a distance between a focus of an X-ray source and a detector, and information about a distance between the focus of the X-ray source and a patient, based on medical information of the first training medical image.

For example, the image generating module 200 determines the attenuation coefficient for each pixel by obtaining information about a tub voltage corresponding to the training medical image. In addition, the image generating module 200 may determine the information about the distance between the focus of the X-ray source and the detector, and the information about the distance between the focus of the X-ray source and the patient, based on image information of the first training medical image.

Further, the image generating module 200 generates the synthesized sinogram based on the attenuation coefficient for each pixel, the information about the distance between the focus of the X-ray source and the detector, and the information about the distance between the focus of the X-ray source and the patient. In this case, the synthesized sinogram may be generated by performing image projection for each rotation angle based on the determined attenuation coefficient for each pixel, the determined information about the distance between the focus of the X-ray source and the detector, and the determined information about the distance between the focus of the X-ray source and the patient.

Further, the image generating module 200 may generate the synthesized sinogram for the organ motion component, by extracting the organ motion component from the synthesized sinogram for the first training medical image (S230).

For example, the image generating module 200 determines a filter kernel according to a rule designated in advance to the synthesized sinogram for the first training medical image. Further, the image generating module 200 may extract the organ motion component based on the determined filter kernel. In this case, the image generating module 200 determines the filter kernel according to a rule designated in advance to easily separate the organ motion component based on a locally changing difference between the organ motion component and a structural component. The image generating module 200 may use the filter kernel to filter the synthesized sinogram for the first training medical image, thereby extracting the organ motion component.

For example, the image generating module 200 may extract the organ motion component by applying two-dimensional (2D) Fourier transform to the synthesized sinogram for the first training medical image. In this case, the image generating module 200 may extract the organ motion component from the synthesized sinogram for the first training medical image by applying the 2D Fourier transform to the synthesized sinogram, multiplying a high frequency band by a preset weight, and applying inverse transform to the weighted high frequency band.

For example, the image generating module 200 may extract the organ motion component by applying 2D wavelet transform to the synthesized sinogram for the first training medical image. In this case, the image generating module 200 may extract the organ motion component based on characteristics that the organ motion component is located in a high frequency region different from that of the structural component within a 2D wavelet region. The image generating module 200 may extract the organ motion component from the synthesized sinogram for the first training medical image by applying the 2D wavelet transform to the synthesized sinogram, multiplying the transformed sinogram by a preset weight, and applying inverse transform to the weighted sinogram.

For example, the image generating module 200 may extract the organ motion component by applying eigen component decomposition of a Hessian matrix to the synthesized sinogram for the first training medical image. The Hessian matrix refers to a matrix of second-order partial derivatives of pixels with respect to vertical and horizontal directions. The first eigen component obtained by the eigen component decomposition of the Hessian matrix represents the structural component, and the second eigen component represents the organ motion component. Thus, the image generating module 200 may extract the organ motion component from the synthesized sinogram for the first training medical image, including the second eigen component in the pixels of the synthesized sinogram for the first training medical image.

Meanwhile, when the organ motion component is extracted from the first training medical image, the image generating module 200 converts a second training medical image 11 including no organ motion component into a synthesized sinogram dimension, thereby combining the extracted organ motion component into the second training medical image 11 (S240).

In this case, the image generating module 200 determines the attenuation coefficient for each pixel of the image, the information about the distance between the focus of the X-ray source and the detector, and the information about the distance between the focus of the X-ray source and the patient, based on the medical information of the second training medical image.

For example, the image generating module 200 determines the attenuation coefficient for each pixel by obtaining information about a tub voltage corresponding to the second training medical image. In addition, the image generating module 200 may determine the information about the distance between the focus of the X-ray source and the detector, and the information about the distance between the focus of the X-ray source and the patient, based on image information of the second training medical image.

Further, the image generating module 200 generates the synthesized sinogram based on the attenuation coefficient for each pixel, the information about the distance between the focus of the X-ray source and the detector, and the information about the distance between the focus of the X-ray source and the patient. In this case, the synthesized sinogram may be generated by performing image projection for each rotation angle based on the determined attenuation coefficient for each pixel, the determined information about the distance between the focus of the X-ray source and the detector, and the determined information about the distance between the focus of the X-ray source and the patient.

Then, the image generating module 200 combines the organ motion component into the synthesized sinogram for the second training medical image (S250). In this case, the image generating module 200 may combine the organ motion component into the synthesized sinogram for the second training medical image through the first deep learning model trained in advance. However, the first deep learning model is merely for describing an embodiment, and there are no limits to such a combining method for the organ motion component.

When the organ motion component is combined into the synthesized sinogram for the second training medical image, the image generating module 200 may generate the training medical image set for each organ by applying a filtered back projection operation to the synthesized sinogram for the second training medical image into which the organ motion component is combined.

Meanwhile, this embodiment describes that the organ motion component acquired from the first training medical image is combined into the second training medical image in the synthesized sinogram dimension. However, the synthesized sinogram dimension is merely for describing an embodiment, and the organ motion component acquired from the first training medical image may be converted into an image dimension and then combined into the second training medical image of the image dimension.

Meanwhile, the image processing module 300 trains the second deep learning model by using the training medical image set for each organ generated in the image generating module 200.

Figure 5:
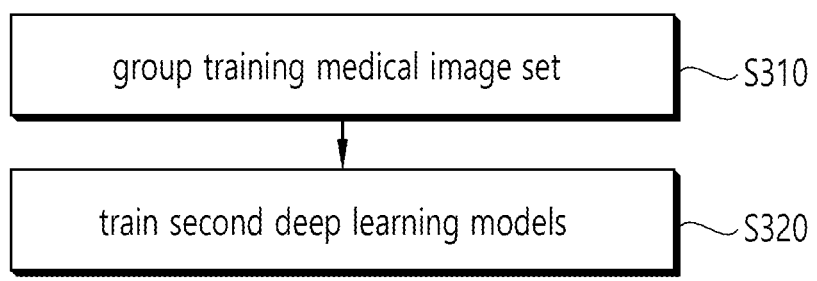
FIG. 5 is a flowchart showing a process of training a second deep learning model in an image processing module according to an embodiment.
Figure 6:
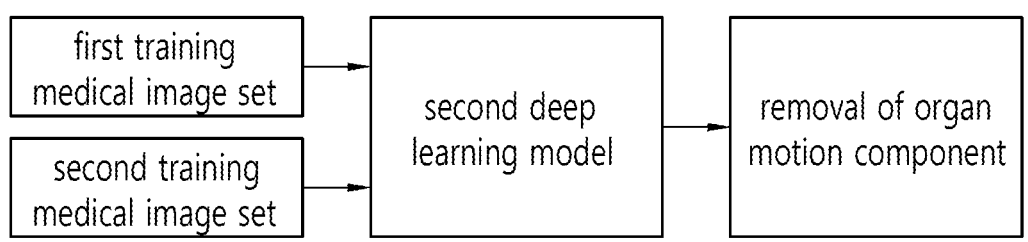
FIG. 6 is a conceptual view showing a process of training a second deep learning model in an image processing module according to an embodiment.

FIG. 5 is a flowchart showing a process of training a second deep learning model in an image processing module according to an embodiment, and FIG. 6 is a conceptual view showing a process of training a second deep learning model in an image processing module according to an embodiment.

As shown in FIGS. 5 and 6, the image processing module 300 according to an embodiment extracts scan information from the training medical image set.

Then, the image processing module 300 groups the training medical image set into a first training medical image set and a second training medical image set for respective organs according to a preset rule (S310). For example, the first training medical image set may include images including the motion of the heart, and the second training medical image set may include images including the motion of the lung.

Thus, the image processing module 300 may train a plurality of second deep learning models corresponding to the number of training medical image sets, i.e., the first training medical image set and the second training medical image set (S320).

For example, each second deep learning model may be trained for both the set of training medical images including the organ motion component and the set of training medical images including no organ motion component, which forms a pair. Thus, the second deep learning model may have a function of deleting the organ motion component from an input processing medical image.

In other words, each second deep learning model may have a function of excluding the motion of the organ from the input processing medical images 12 by repetitively performing training so that a difference between the grouped set of medical images including the organ motion component and the grouped set of medical images including no organ motion component can be minimized with respect to the second training medical image.

Meanwhile, when the second deep learning model is completely trained, the image processing module 300 may generate a high-quality readout image 30 by deleting the motion of organs from the processing medical images 12 including the organs.

Figure 7:
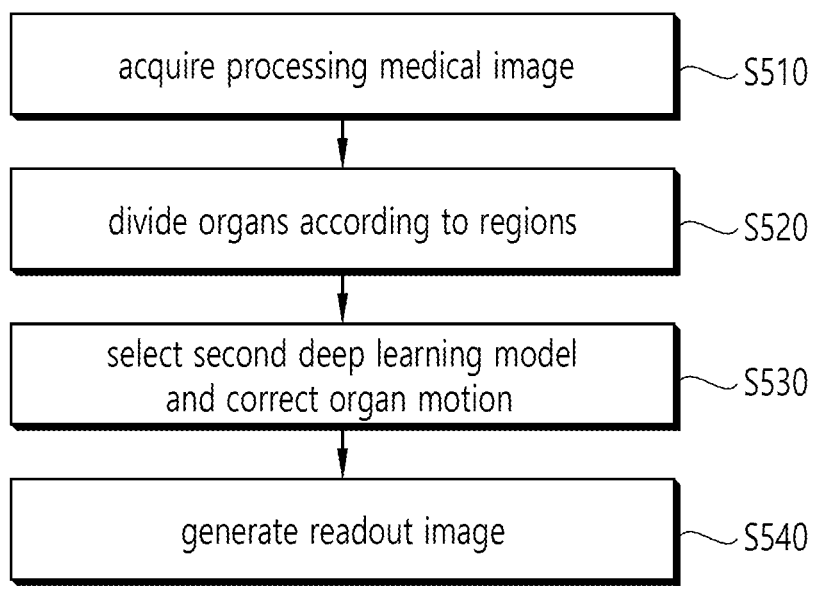
FIG. 7 is a flowchart showing a process of generating a high-quality readout image in an image processing module according to an embodiment.
Figure 8:
FIGS. 8 and 9 are conceptual views showing a process of generating a high-quality readout image in an image processing module according to an embodiment.
Figure 9:
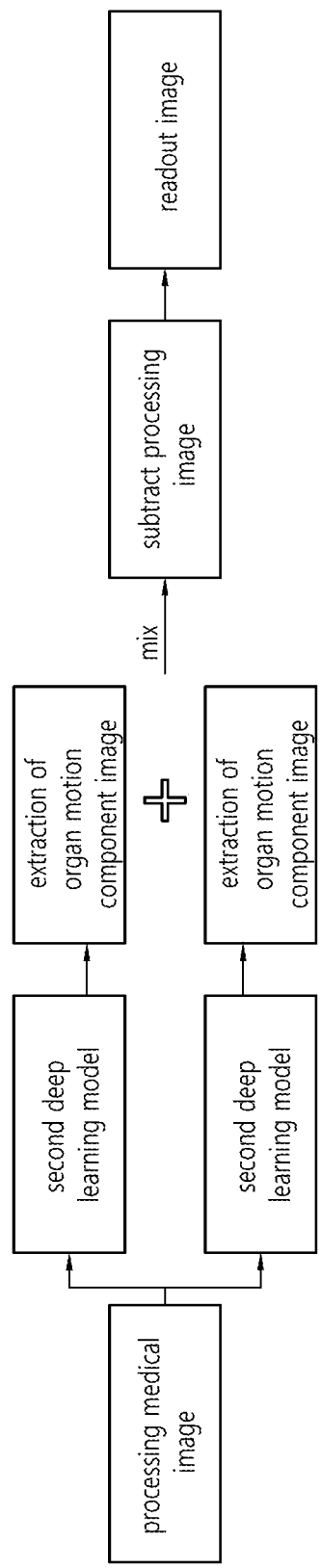

FIG. 7 is a flowchart showing a process of generating a high-quality readout image in an image processing module according to an embodiment, and FIGS. 8 and 9 are conceptual views showing a process of generating a high-quality readout image in an image processing module according to an embodiment.

As shown in FIGS. 7 to 9, the image processing module 300 according to an embodiment receives the processing medical images 12 through the communication module 100 (S510).

Further, the image processing module 300 may divide the organs included in the processing medical images 12 according to regions (S520). In this case, the deep learning model trained in advance may be used to divide the organs according to the regions. In this case, the deep learning model may divide the organs with respect to a profile axis of motion. However, such division of the deep learning model is merely for describing an embodiment, and there are no limits to the application of the deep learning model.

Then, the image processing module 300 may apply motion correction to an organ, the motion of which needs to be excluded, among the organs divided based on the second deep learning model (S530).

In other words, the image processing module 300 selects the second deep learning model corresponding to the organ, which needs the motion correction, and inputs the processing medical images 12 to the selected second deep learning model. In this case, a plurality of second deep learning models may be used alone or together according to the number of organs which need the motion correction.

For example, as shown in FIG. 8, when a single second deep learning model is required for the organ motion correction, the image processing module 300 inputs the processing medical images 12 to the single second deep learning model, so that the selected second deep learning model can extract the organ motion component image from the processing medical images 12, multiply the extracted organ motion component image by a preset value, e.g., a preset ratio, and subtract the multiplied organ motion component from the processing medical images, thereby generating a readout image excluding the motion of the organ from the processing medical images 12 (S540).

For example, as shown in FIG. 9, when a plurality of deep learning models are required for the organ motion correction, the image processing module 300 inputs the processing medical images to each of the plurality of second deep learning models. Therefore, each second deep learning model may extract the organ motion component image from the processing medical images, mix a plurality of organ motion component images respectively extracted by the plurality of second deep learning models according to a preset rule, and subtract the mixed organ motion component image from the processing medical images, thereby generating a readout image excluding the motion of the organ from the processing medical images 12.

Accordingly, the apparatus and method for processing the medical images according to the disclosure have effects as follows.

First, the organ motion in the medical image is corrected based on the deep learning model, thereby having an effect on obtaining the high-quality readout image.

Second, the plurality of deep learning models are made and trained for respective organs, and therefore the deep learning is more effectively applied to the medical images in which safety is important.

The embodiments of the disclosure described above and illustrated in the accompanying drawings should not be construed as limiting the technical spirit of the disclosure. The scope of disclosure should be limited only by the matters disclosed in the appended claims, and various modifications and changes can be made thereto by a person having ordinary knowledge in the art to which the disclosure pertains. Accordingly, such various modifications and changes would fall into the scope of the disclosure as long as they are apparent to a person having ordinary knowledge in the art.

What is claimed is:

1. A motion compensation processing method of a medical image, the method comprising:
    acquiring the medical image and combining an organ motion component into the medical image;
    training at least one deep learning model based on the medical image combined with the organ motion component so that the deep learning model can remove the organ motion component; and
    acquiring a processing medical image, selecting a deep learning model corresponding to an organ included in the processing medical image, and removing a motion component for the organ,
    wherein the removing comprises:
        dividing organs included in the processing medical image according to regions;
        selecting the deep learning model corresponding to the organ, of which motion needs to be removed, among the divided organs; and
        removing the motion of the organ based on the deep learning model.

2. The method of claim 1, wherein the combining of the organ motion component comprises combining a first medical image including an organ motion component and a second medical image including no organ motion component.

3. The method of claim 2, wherein the combining of the first medical image and the second medical image is performed in a sinogram dimension.

4. The method of claim 2, wherein the combining of the organ motion component comprises a deep learning model that extracts the organ motion component from the first medical image and combines the organ motion component into the second medical image.

5. The method of claim 2, wherein the combining of the organ motion component comprises:
    converting the first medical image into a sinogram dimension;
    extracting the organ motion component from a sinogram for the first medical image;
    converting the second medical image into a sinogram dimension;
    combining the organ motion component into a sinogram for the second medical image; and
    converting the sinogram for the second medical image combined with the organ motion component into an image dimension by back projection.

6. The method of claim 1, wherein the training comprises training the deep learning model for a pair of the medical image including the organ motion component and the medical image including no organ motion component.

7. The method of claim 6, wherein the deep learning model is trained to minimize a difference between the medical image including the organ motion component and the medical image including no organ motion component with respect to the medical image including no organ motion component.

8. The method of claim 1, wherein the deep learning models are used alone or together with respect to the number of organs of which motion needs to be removed.

9. The method of claim 8, wherein, upon using the deep learning model alone, the deep learning model removes the organ motion component by extracting an organ motion component image from the processing medical image, applying a preset value to the extracted organ motion component image, and subtracting the extracted organ motion component image, to which the preset value is applied, from the processing medical image.

10. The method of claim 8, wherein, upon using the deep learning models together, the plurality of deep learning models removes the organ motion component by extracting corresponding organ motion component images from input processing medical images, mixing a plurality of organ motion component images according to a preset rule, and subtracting the mixed organ motion component image from the processing medical image.

11. The method of claim 1, wherein the dividing according to the regions comprises using a deep learning model that divides the organs according to the regions based on a profile of organ motion.

12. The method of claim 1, wherein the deep learning model comprises a plurality of deep learning models provided corresponding to a plurality of organs and trained to remove the motion of the organs.

13. A motion compensation processing apparatus of a medical image, the apparatus comprising:
    a communication module configured to receive the medical image;
    an image generating module configured to combine an organ motion component into the medical image; and
    an image processing module configured to train at least one deep learning model based on the medical image combined with the organ motion component, and remove a motion component for an organ by selecting a deep learning model corresponding to an organ included in a processing medical image while providing the processing medical image,
    wherein the image processing module is configured to remove the motion component for the organ by dividing organs included in the processing medical image according to regions, selecting the deep learning model corresponding to the organ, of which motion needs to be removed, among the divided organs, and removing the motion of the organ based on the deep learning model.

* * * * *